(12) United States Patent
Majumdar et al.

(10) Patent No.: US 12,438,879 B2
(45) Date of Patent: Oct. 7, 2025

(54) METHODS, SYSTEMS, AND COMPUTER READABLE MEDIA FOR ZERO TRUST NETWORK ACCESS (ZTNA) TESTING USING APPLICATION-INDEPENDENT AUTHENTICATION PROFILES

(71) Applicant: Keysight Technologies, Inc., Santa Rosa, CA (US)

(72) Inventors: Partha Majumdar, West Hills, CA (US); Tudor Simionescu, Bucharest (RO); Rudrarup Naskar, Kolkota (IN); Sawan Das, Kolkata (IN); Sirshendu Rakshit, West Bengal (IN); Andrei Daniel Safta, Ploiesti (RO); Tiberiu Viorel Barbu, Buzau (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 248 days.

(21) Appl. No.: 18/142,572

(22) Filed: May 2, 2023

(65) Prior Publication Data

US 2024/0364691 A1    Oct. 31, 2024

(30) Foreign Application Priority Data

Apr. 28, 2023 (RO) .............................. a 2023 00214

(51) Int. Cl.
H04L 9/40 (2022.01)
(52) U.S. Cl.
CPC ............ H04L 63/102 (2013.01); H04L 63/20 (2013.01)
(58) Field of Classification Search
CPC ....... H04L 63/102; H04L 63/20; H04L 63/08; G06F 21/31; H04W 12/06
See application file for complete search history.

(56) References Cited

U.S. PATENT DOCUMENTS 8,392,982 B2   3/2013  Harris et al.
11,100,503 B2  8/2021  Iyer et al.
(Continued)

FOREIGN PATENT DOCUMENTS

WO    2020207517 A1    10/2020

OTHER PUBLICATIONS

Zanasi et al, A Zero Trust approach for the cybersecurity of Industrial Control Systems, 2022, IEEE (Year: 2022).*
(Continued)

*Primary Examiner* — Philip J Chea
*Assistant Examiner* — Jasmine Mochen Day

(57) ABSTRACT

A method for ZTNA testing using application-independent authentication profiles includes providing, at a network traffic emulation platform, user-selectable application flows for generating emulated application traffic to send to an application and providing application-independent authentication profiles for emulating authentication messaging of different ZTNA systems. The method further includes selecting one of the application flows and receiving, at the network traffic emulation platform, user selection of one of the application-independent authentication profiles. The method further includes generating and transmitting emulated authentication traffic to a ZTNA system according to the selected authentication profile, and, in response to successful completion of exchanges required by the authentication profile, generating and transmitting emulated application traffic to a network application according to the user-selected application flow.

16 Claims, 9 Drawing Sheets

(56) References Cited

U.S. PATENT DOCUMENTS

| | | | |
|---|---|---|---|
| 11,240,225 B1 | 2/2022 | Seever et al. | |
| 11,323,438 B2 | 5/2022 | Ray et al. | |
| 11,570,172 B2* | 1/2023 | Specht | H04L 63/08 |
| 11,647,010 B2* | 5/2023 | Cheng | H04L 9/3247 |
| | | | 713/168 |
| 2010/0242105 A1 | 9/2010 | Harris et al. | |
| 2010/0290476 A1 | 11/2010 | Brindle et al. | |
| 2011/0225267 A1 | 9/2011 | Ohashi | |
| 2016/0266915 A1 | 9/2016 | Morelli et al. | |
| 2018/0295134 A1 | 10/2018 | Gupta et al. | |
| 2021/0336959 A1* | 10/2021 | Shah | H04L 63/0281 |
| 2022/0210173 A1* | 6/2022 | Katmor | H04L 63/1416 |
| 2022/0239640 A1* | 7/2022 | Wang | H04L 63/0815 |
| 2022/0400114 A1* | 12/2022 | Sreedhar | H04L 63/20 |
| 2023/0053702 A1* | 2/2023 | Gupta | H04L 63/029 |
| 2023/0079444 A1* | 3/2023 | Parla | H04L 61/4511 |
| | | | 726/11 |
| 2023/0123781 A1* | 4/2023 | Kaimal | H04L 41/0893 |
| | | | 726/12 |
| 2023/0129466 A1* | 4/2023 | Moore | G06F 11/3438 |
| | | | 726/17 |
| 2025/0016666 A1 | 1/2025 | Zaks | |
| 2025/0112946 A1 | 4/2025 | Das et al. | |

OTHER PUBLICATIONS

Qazi, Study of Zero Trust Architecture for Applications and Network Security, 2022, IEEE (Year: 2022).*

Non-Final Office Action for U.S. Appl. No. 18/375,245 (May 19, 2025).

Fu, et al., "Application Independent Identity Management", IEEE, pp. 625-628 (2010).

Keysight Technologies, "Keysight CyPerf", Distributed, Elastic Network Performance and Security Validation, pp. 1-12 (May 2021).

* cited by examiner

METHODS, SYSTEMS, AND COMPUTER READABLE MEDIA FOR ZERO TRUST NETWORK ACCESS (ZTNA) TESTING USING APPLICATION-INDEPENDENT AUTHENTICATION PROFILES

CROSS-REFERENCE TO RELATED APPLICATIONS

This application claims the priority benefit of Romanian Patent Application No. a 2023 00214 entitled, "METHODS, SYSTEMS, AND COMPUTER READABLE MEDIA FOR ZERO TRUST NETWORK ACCESS (ZTNA) TESTING USING APPLICATION-INDEPENDENT AUTHENTICATION PROFILES" and filed on Apr. 28, 2023, the disclosure of which is incorporated herein by reference in its entirety.

TECHNICAL FIELD

The subject matter described herein relates to ZTNA testing. More particularly, the subject matter described herein relates to methods, systems, and computer readable media for ZTNA testing using application-independent authentication profiles.

BACKGROUND

ZTNA (Zero Trust Network Access) is a security model for providing remote access to a resource, such as a web server, that is based on the principle that no one seeking to access the resource can be trusted, irrespective of location, IP address, etc. Therefore, every access to the resource or application must be authenticated.

ZTNA achieves network authentication in two different ways: client-based ZTNA and clientless ZTNA. Client-based ZTNA requires an authenticated tunnel to be established between the machine that is trying to access resources/applications in a network and a secure gateway in the network. The remote endpoints of the tunnels established with the secure gateway form a perimeter of verified access points, also known as Software Defined Perimeters (SDP). This is achieved by installing a client agent/application on the remote endpoints. The ZTNA clients also use proprietary protocols for communicating with the secure gateways.

Clientless ZTNA does not require an endpoint agent. Clientless ZTNA primarily applies to web-based resource access. The web-based protocol used may include HTTP, HTTPS, HTTP2, HTTP3, etc. Clientless ZTNA can be achieved via communication through web-proxies including, but not limited to explicit proxies, reverse proxies, etc. Clientless ZTNA is also achieved via URL manipulation (e.g., by adding a prefix to the application URL), DNS manipulation (e.g., the application URL in a request to access a network resource is mapped to the IP address of a secure gateway), etc.

Even though the actual message exchanges involved in clientless ZTNA can be vendor- and implementation-specific, clientless ZTNA can be generalized in the following way. All the parties involved in a clientless ZTNA system can be categorized in one of the following categories:
 1. Application Client/Web Browser
 2. PEP (Policy Enforcement Point)/Secure Gateway
 3. IdP (Identity Provider)
 4. Application Server It is desirable to send emulated traffic to web applications where access is protected by clientless ZTNA systems. Emulated application traffic can be generated using emulated client applications, such as emulated web browsers, emulated social media clients, emulated email clients, etc., that emulate typical application exchanges according to the application protocol. To access the applications protected by ZTNA systems, ZTNA authentication code can be added to each emulated client application. However, adding ZTNA authentication code to each emulated client application is not a scalable solution, given that there may be hundreds of application sequences to test, as well as different ZTNA systems that may be implemented.

In light of these and other difficulties, there exists a need for improved methods, systems, and computer readable for ZTNA testing using application-independent authentication profiles.

SUMMARY

A method for zero trust network access (ZTNA) testing using application-independent authentication profiles includes providing, at a network traffic emulation platform, a plurality of user-selectable application flows for generating emulated application traffic to send to an application. The method further includes providing, at the network traffic emulation platform, a plurality of user-selectable application-independent authentication profiles for emulating authentication messaging of different ZTNA systems. The method further includes selecting, at the network traffic emulation platform, one of the application flows. The method further includes receiving, at the network traffic emulation platform, user selection of one of the application-independent authentication profiles. The method further includes generating and transmitting emulated authentication traffic to a ZTNA system according to the selected authentication profile. The method further includes, in response to successful completion of exchanges required by the authentication profile, transmitting emulated application traffic to a network application according to the user-selected application flow.

According to another aspect of the subject matter described herein, providing the user-selectable application flows includes providing application flows for communicating with applications on one or more web servers.

According to another aspect of the subject matter described herein, providing the user-selectable application-independent authentication profiles includes providing profiles for emulating a policy enforcement point (PEP) profile.

According to another aspect of the subject matter described herein, providing the user-selectable application-independent authentication profiles includes providing profiles for emulating an identity provider (IdP) profile.

According to another aspect of the subject matter described herein, transmitting emulated authentication traffic to the ZTNA system includes transmitting emulated PEP traffic to a PEP according to the PEP profile and transmitting emulated IdP traffic to an IdP according to the IdP profile.

According to another aspect of the subject matter described herein, transmitting the emulated authentication traffic to the ZTNA system includes providing the authentication profile to a traffic generation engine and generating the emulated authentication traffic using the traffic generation engine.

According to another aspect of the subject matter described herein, the authentication profile causes the traffic generation engine to listen for responses to the emulated authentication traffic and to proceed with generation of the emulated application traffic when the responses conform to expected exchanges of the authentication profile.

According to another aspect of the subject matter described herein, generating the emulated application traffic includes providing the application flow to a traffic generation engine and generating the emulated application traffic using the traffic generation engine.

According to another aspect of the subject matter described herein, providing the user-selectable application flows and application independent authentication profiles includes providing a user interface allowing the user to create different combinations of application flows and authentication profiles by separately selecting the application flows and the authentication profiles.

According to another aspect of the subject matter described herein, the user interface allows the user to select more than one of authentication profiles and wherein selecting one of the application-independent authentication profiles includes transmitting an initial application message to the network application according to the user-selected application flow, receiving a response, and selecting the application-independent authentication profile dynamically at run time based on the response and from the application-independent authentication profiles selected by the user.

According to another aspect of the subject matter described herein, A system for zero trust network access (ZTNA) testing using application-independent authentication profiles is provided. The system includes a network traffic emulation platform including at least one processor and a memory. The system further includes a plurality of user-selectable application flows stored in the memory and for generating emulated application traffic to send to an application. The system further includes a plurality of user-selectable application-independent authentication profiles stored in the memory and for emulating authentication messaging of different ZTNA systems. The system further includes a user interface for receiving user selection of one of the application flows. The system further includes a traffic generation engine for selecting one of the application-independent authentication profiles, generating and transmitting emulated authentication traffic to a ZTNA system according to the selected authentication profile, and, in response to successful completion of exchanges required by the authentication profile, transmitting emulated application traffic to a network application according to the user-selected application flow.

According to another aspect of the subject matter described herein, the user-selectable application flows comprise application flows for communicating with applications on one or more web servers.

According to another aspect of the subject matter described herein, at least one of the user-selectable application-independent authentication profiles a policy enforcement point (PEP) profile.

According to another aspect of the subject matter described herein, at least one of the user-selectable application-independent authentication profiles includes an identity provider (IdP) profile.

According to another aspect of the subject matter described herein, the traffic generation engine is configured to generate and transmit emulated PEP traffic to a PEP according to the PEP profile and generate and transmit emulated IdP traffic to an IdP according to the IdP profile.

According to another aspect of the subject matter described herein, the network traffic generation platform is configured to generate the emulated authentication traffic by providing the authentication profile to the traffic generation engine.

According to another aspect of the subject matter described herein, the authentication profile causes the traffic generation engine to listen for responses to the emulated authentication traffic and to proceed with generation of the emulated application traffic when the responses conform to expected exchanges of the authentication profile.

According to another aspect of the subject matter described herein, the user interface allows the user to select more than one of authentication profiles and wherein, in selecting one of the application-independent authentication profiles, the traffic generation engine is configured to transmit an initial application message to the network application according to the user-selected application flow, receive a response, and select the application-independent authentication profile dynamically at run time based on the response and from the application-independent authentication profiles selected by the user.

According to another aspect of the subject matter described herein, the user interface is configured to allow the user to create different combinations of the application flows and the authentication profiles by separately selecting the application flows and the authentication profiles.

According to another aspect of the subject matter described herein, a non-transitory computer readable medium having stored thereon executable instructions that when executed by a processor of a computer control the computer to perform steps is provided. The steps include providing, at a network traffic emulation platform, a plurality of user-selectable application flows for generating emulated application traffic to send to an application. The steps further include providing, at the network traffic emulation platform, a plurality of application-independent authentication profiles for emulating authentication messaging of different zero trust network access (ZTNA) systems. The steps further include selecting, at the network traffic emulation platform, one of the application flows. The steps further include receiving, at the network traffic emulation platform, user selection of one of the application-independent authentication profiles. The steps further include generating and transmitting emulated authentication traffic to a ZTNA system according to the selected authentication profile. The steps further include, in response to successful completion of exchanges required by the authentication profile, generating and transmitting emulated application traffic to a network application according to the user-selected application flow.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps.

Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

The subject matter described herein includes methods and systems for ZTNA testing using application-independent authentication profiles. ZTNA testing, as used herein, includes testing network components that are configured to receive and pass ZTNA-authenticated traffic flows. Examples of network components that may be tested using the subject matter described herein include firewalls, load balancers, or any other component through which ZTNA-authenticated traffic can pass. The purpose of such testing is often to test the performance and functionality of the intermediate devices under realistic network traffic conditions. In networks that use ZTNA, it may be desirable to test whether the devices properly pass (or block) ZTNA-authenticated and non-authenticated traffic flows to validate the security model.

Figure 1:
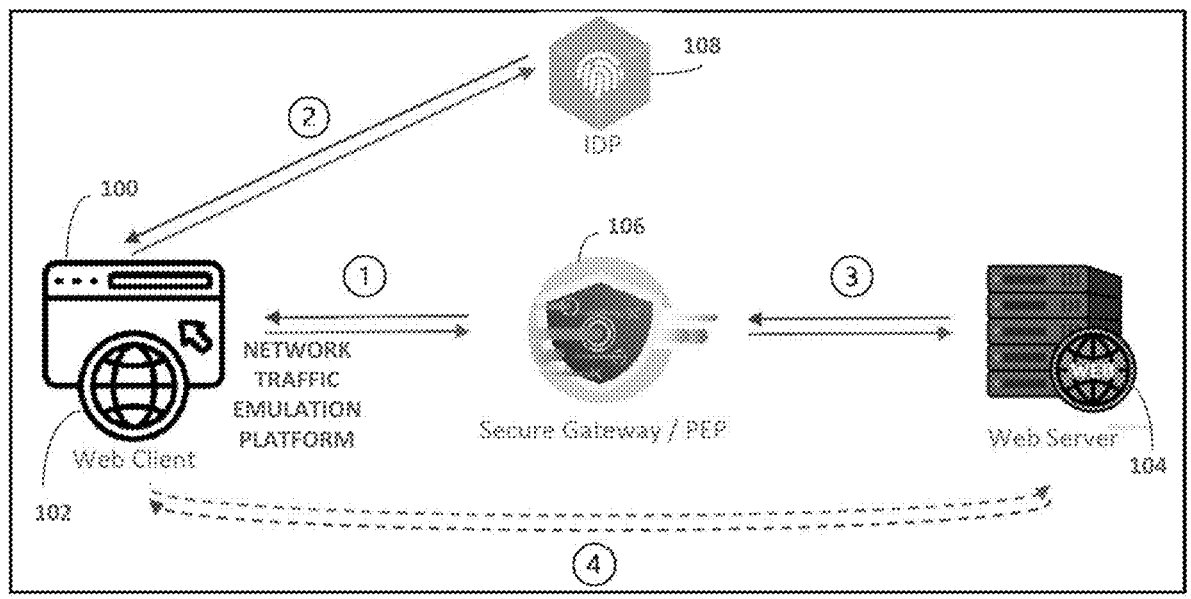
FIG. 1 is a network diagram illustrating exemplary messages exchanged in a clientless ZTNA authentication sequence.

To make ZTNA testing more scalable, the methods and systems described herein include authentication profiles that implement clientless ZTNA exchanges and that are independent from the application flows used to generate emulated application traffic. FIG. 1 is a network diagram illustrating exemplary network entities and exchanges associated with clientless ZTNA. The clientless ZTNA exchange illustrated in FIG. 1 may be implemented using an application-independent authentication profile, which can be paired with any application flow to contact or send traffic to a network application. Referring to FIG. 1, a network traffic emulation platform 100 may emulate a web client 102 to generate and send web traffic. The ZTNA system illustrated in FIG. 1 includes PEP 106 and IdP 108. To contact web server 104, network traffic emulation platform 100 accesses an application-independent authentication profile that first causes network traffic emulation platform 100 to initiate an authentication exchange with security gateway/PEP 106. To complete the authentication exchange, network traffic emulation platform 100 first tries to access the application URL through secure gateway/PEP 106 (Path 1 in FIG. 1) by transmitting an access request to the URL of web server 104 via secure gateway/PEP 106. If the request is not authenticated, then the secure gateway/PEP 106 redirects the client to IdP 108. Network traffic emulation platform 100 then provides authentication credentials to IdP 108 (Path 2 in FIG. 1). If the credentials are valid, then IdP 108 redirects network traffic emulation platform 100 back to secure gateway/PEP 106 with an authenticated cookie. Secure gateway/PEP 106 finally redirects web client 102 back to the original application URL with the authenticated cookie. Any subsequent requests sent to web server 104 with the authenticated cookie are allowed through the secure gateway 106 directly to the web server (Path 1 and Path 3 in FIG. 1). In the absence of a ZTNA system, web client 102 would communicate directly with web server 104 (path 4 in FIG. 1). It should be noted that in a test environment, web server 104 may also be emulated using network traffic emulation platform 100. However, the subject matter described herein is not limited to using emulated web servers. Using a non-emulated web server in a test or live network environment is intended to be within the scope of the subject matter described herein.

Figure 2:
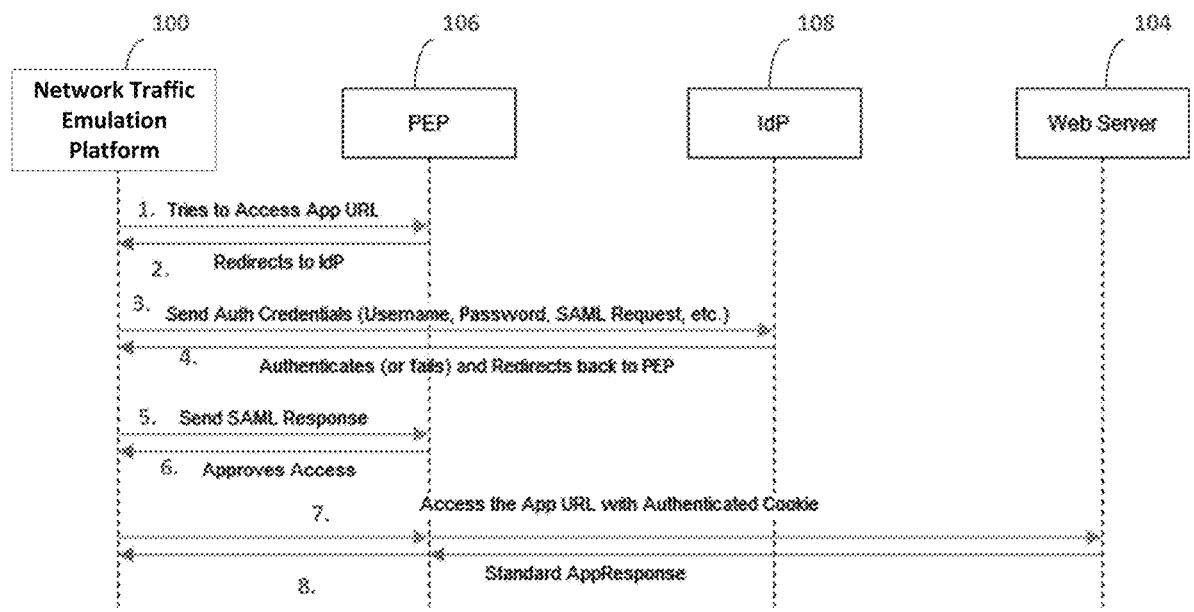
FIG. 2 is a message flow diagram illustrating message flows associated with clientless ZTNA.

FIG. 2 illustrates exemplary messages exchanged between network traffic emulation platform 100 and a clientless ZTNA system. Referring to FIG. 2, in step 1, network traffic emulation platform 100 attempts to access the URL of the target application via PEP 106. In step 2, PEP 106 redirects network traffic emulation platform 100 to IdP 108. In step 3, network traffic emulation platform 100 sends authentication credentials to IdP 108. In the illustrated example, the authentication credentials include a username, password, and a security assertion markup language (SAML) request. The subject matter described herein is not limited to SAML authentication. SAML is used as an example of an authentication protocol that can be implemented by an application-independent authentication profile. Authentication protocols other than SAML can be implemented without departing from the scope of the subject matter described herein.

If the authentication is successful, in step 4, IdP 108 redirects network traffic emulation platform 100 back to PEP 106. In step 5, network traffic emulation platform 100 sends an SAML response to PEP 106. In step 6, PEP 106 approves the access. In step 7, network traffic emulation platform 100 accesses application 104 with the authenticated cookie. In step 8, application 104 responds to the access request. For example, network traffic emulation platform 100 emulates a web client, the access request may be an HTTP GET request for all or part of a web page, and the response from application 104 may be an HTTP PUT message with the requested file or files for displaying the web page.

Traditional Test Configuration

In some traditional network test tools, a new application flow (also referred to as a SuperFlow) or a hardcoded sequence of web exchanges is created to represent the entire exchange between the network traffic emulation system and the application. This approach has a significant drawback in terms of scalability.

There are hundreds of applications that a testing tool may need to emulate along with tens of IdPs and secure gateways. Each application, secure gateway, and IdP has its own communication protocol. Using the traditional approach, a test tool may need to create a separate flow definition for each combination of SGW (secure gateway), IdP and application activity. One can easily see that there may be tens of thousands of possible combinations of application flows and authentication protocols. As a result, traditional test tools may, instead of implementing a realistic authentication sequence, utilize a less realistic mix, such as a simple HTTP GET or POST message to emulate a ZTNA scenario. This significantly restricts the possible realistic scenarios a user can emulate through a ZTNA system.

Test Configuration with Authentication Profiles

The subject matter described herein includes a network traffic emulation system that emulates more realistic application flows through ZTNA systems. The network traffic emulation system separates traffic flows into the following components:

1. Application Flow
2. Authentication Profile

As used herein, an application flow is a sequence of steps defined in the network traffic emulation system that causes the traffic generator of network traffic generation system to exchange a sequence of messages with one or more network applications. An authentication profile is a sequence of steps defined in the network traffic emulation system that causes the traffic generator of the network traffic generation system to exchange a sequence of authentication messages with ZTNA network components. The authentication profile is further separated into the following subcomponents:

2.1. PEP Profile
2.2. IdP Profile

The application flows are defined in a network agnostic way. The application flows may be defined with the assumption that the clients will have direct access to the servers (see path 4 in FIG. 1). That is, the application flows may each represent a sequence of messages that will be exchanged between applications without including any of the messages associated with the authentication profile. The application flow definitions can be used for emulating traffic flowing through networks with simple load balancers, firewalls, next generation firewalls, deep packet inspection (DPI) devices, etc.

PEP profiles are defined for some well-known (on the order of tens) PEP/SGW implementations. IdP profiles are defined for some well-known identity providers. A smart traffic generation engine/agent combines an authentication profile, which includes a combination of a PEP profile and an IdP profile, with the application flow at run time depending on the responses it receives. The overall workflow can be summarized in the following steps.

1. The user defines an app-mix (a mix of application flows with different weights).
   i. These app-mixes can be saved and reused in other tests too.
   ii. These app-mixes can be emulated even without any authentication profile i.e., any ZTNA setup.
2. The user associates the selected or defined application flow(s) with one or more authentication profiles; i.e., with
   i. A PEP Profile; and
   ii. An IdP Profile.
3. The traffic generation engine is fed to the app-mix and the list of authentication profiles separately.
4. The traffic generation engine starts emulating an application flow (from the mix) normally with the initial request.
5. The traffic generation engine takes different paths depending on the response.
   i. If the response matches the expected response from the application server, then the engine follows through the application exchanges normally.
   ii. If the response matches the authentication profile, then the engine starts communicating with the PEP and IdP, following the PEP and IdP profile definition under the authentication profile.
6. Once the engine starts following an authentication profile, it either successfully completes all exchanges defined under the PEP profile and IdP profile or fails in the middle. Any failure results in application failure.
   i. IdP and PEP communication related statistics are updated in the process.
7. If all the PEP and IdP exchanges are completed successfully and the first expected response from the application server is received, then the engine starts following the application flow normally (same as what it would have done without authentication profiles).

It should be noted from the description above that it is not necessary to define thousands of combinations of applications, PEP, and IdP profiles. The subject matter described herein allows the test engineer or user to define a few hundred application flows, tens of profiles, and combine the application flows with the authentication profiles dynamically at run time.

Figure 3:
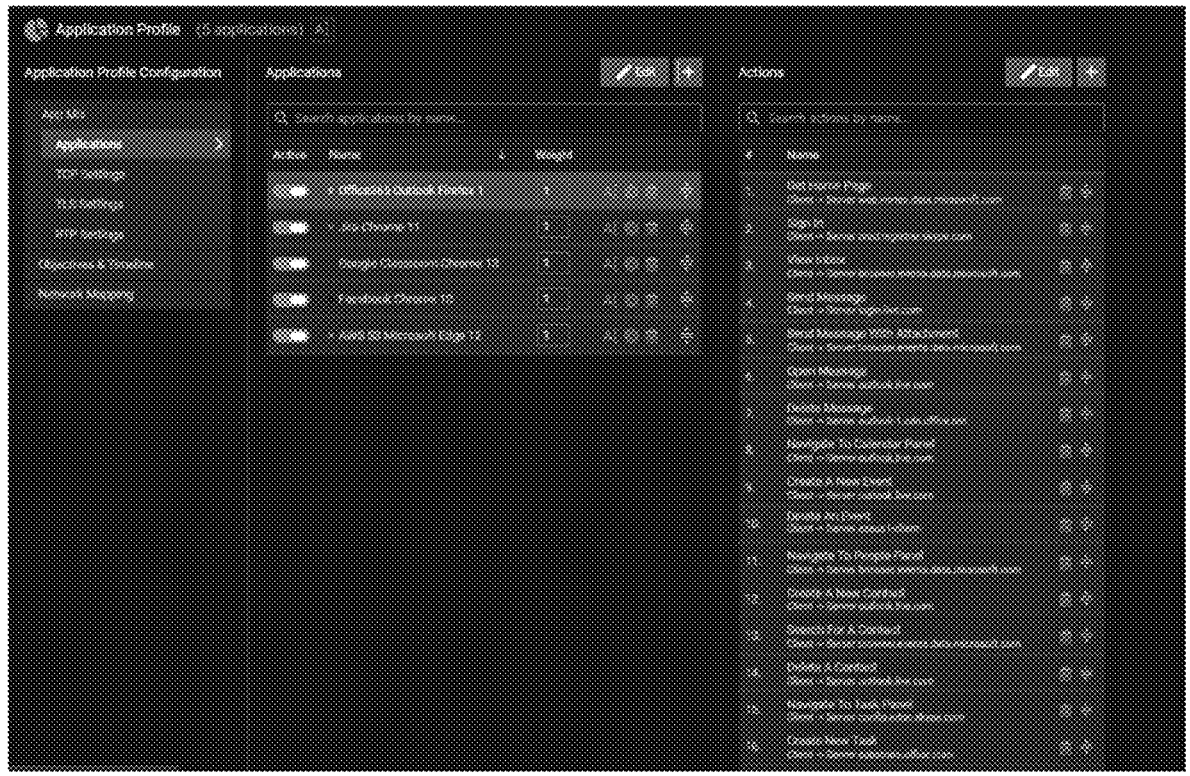
FIG. 3 is a computer screen shot illustrating an exemplary graphical user interface for selecting application flows that generate emulated application traffic.
Figure 4:
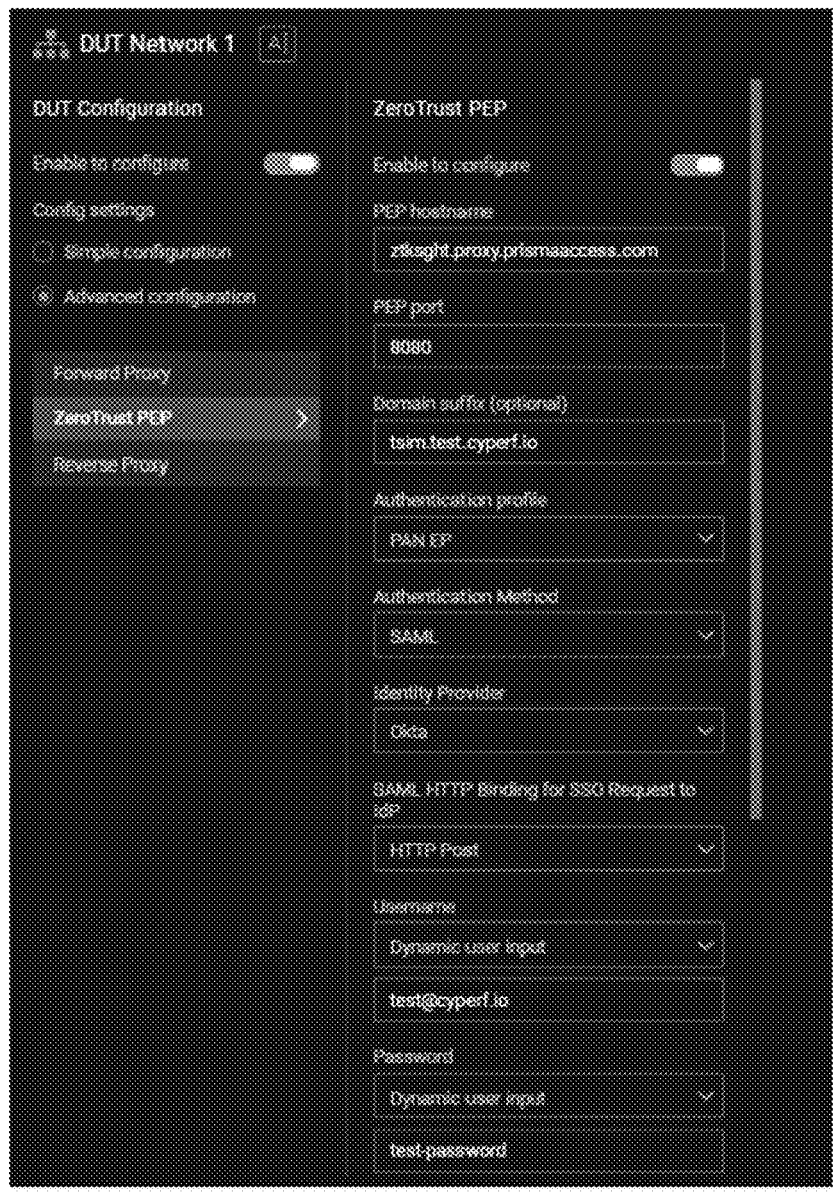
FIG. 4 is a computer screen shot illustrating an exemplary graphical user interface for selecting authentication profiles to be combined with the application flows in FIG. 3.

FIG. 3 illustrates an example of a user interface that allows a user to select an application mix, and FIG. 4 is a graphical user interface that allows a user to select and configure an authentication profile. In FIG. 3, the leftmost menu allows a user to initiate the process of selecting and configuring an application mix. When the user selects "applications" in the leftmost menu, the center menu displays different mixes of applications for sending emulated traffic are displayed. In the illustrated example, the selected application flow includes Microsoft Office 365, Microsoft Outlook, and Firefox. The rightmost menu displays actions performed for the selected application mix. In the illustrated example, the application the actions include getting the home page, signing in, viewing an inbox, sending a message, etc. It should be noted that the authentication profile exchanges are not part of the application mix.

FIG. 4 illustrates selection and configuration of an authentication profile. In FIG. 4, in the left-hand menu, the user is presented with different authentication profiles allowing the user to select among the profiles. The user in FIG. 4 has selected an authentication profile called zero trust PEP. The right-hand menu in FIG. 4 allows the user to configure different settings of the selected authentication profile. The settings include PEP hostname, PEP port, domain suffix, authentication profile, authentication method, identity provider, etc.

Once the user selects and configures the authentication profile using the graphical user interface illustrated in FIG. 4, the user can instruct the network traffic emulation platform to execute a test. The network traffic emulation platform automatically combines the selected authentication profile with the application mix. The first application flow in the application profile begins, and if the first response is received from an authentication server, the authentication profile is executed. If the exchanges required by the authentication profile are successfully completed, the network traffic emulation platform executes the remainder of message exchanges required the application flow(s).

Figure 5A:
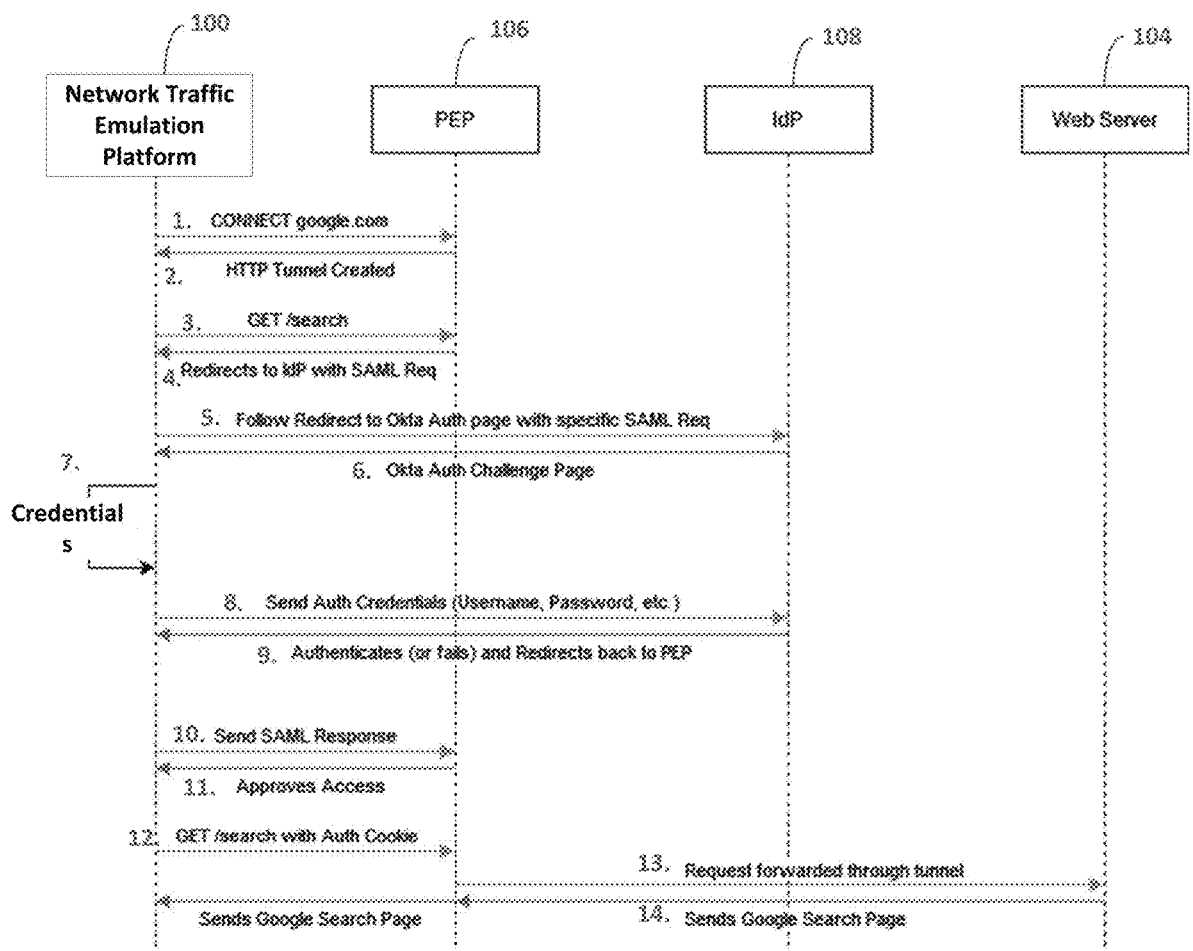
FIGS. 5A and 5B are message flow diagrams illustrating exemplary messages exchanged for generating emulated ZTNA and application traffic using application-independent authentication profiles and application flows.

FIG. 5A illustrates an example of messages exchanged when network traffic emulation platform implements an authentication profile and an application flow. In FIG. 5A, the authentication profile includes interaction with a PEP and Okta (see www.okta.com) as an identity provider, and the application flow involves research using the Google search engine. Referring to the message flow in FIG. 5A, in step 1, network traffic emulation platform 100 initiates the application flow by sending an HTTP CONNECT request to google.com. In step 2, PEP 106 intercepts the HTTP CONNECT request and responds indicating that an HTTP tunnel has been created. In step 3, network traffic emulation platform 100 sends an HTTP GET request to PEP 106 with the requested Google search terms. In step 4, PEP 106 responds to network traffic emulation platform 100 redirecting network traffic emulation platform 100 to IdP 108. The message redirecting network traffic emulation platform 100 to IdP 108 causes network traffic emulation platform 100 to execute the authentication profile.

In step 5, network traffic emulation platform 100 contacts IdP 108 with a specific SAML request. In step 6, IdP 108 responds with an Okta authentication challenge page. In step 7, network traffic emulation platform 100 provides authentication credentials requested by the Okta challenge page. Normally, such credentials would be input by the user. In this case, the authentication credentials are provided by the authentication profile being emulated by network traffic emulation platform 100. In step 8, network traffic emulation platform 100 sends the authentication credentials to IDP 108. In step 9, IdP 108 responds indicating that the authentication has passed or failed and redirects network traffic emulation platform back to PEP 106.

In step 10, network traffic emulation platform 100 sends an SAML response to PEP 106. In step 11, PEP 106 approves access. In step 12, network traffic emulation platform 100 sends an HTTP GET request with search terms and an authentication cookie to web server 106. In step 13, PEP 106 forwards the request with the search terms through the tunnel to web server 104. In step 14, web server 104 provides the requested search results to network traffic emulation platform 100 via PEP 106. Thus, FIG. 5A illustrates a combination of an application flow and a specific authentication profile where the authentication profile is separate from the application flow and can be combined with other application flows.

Figure 5B:
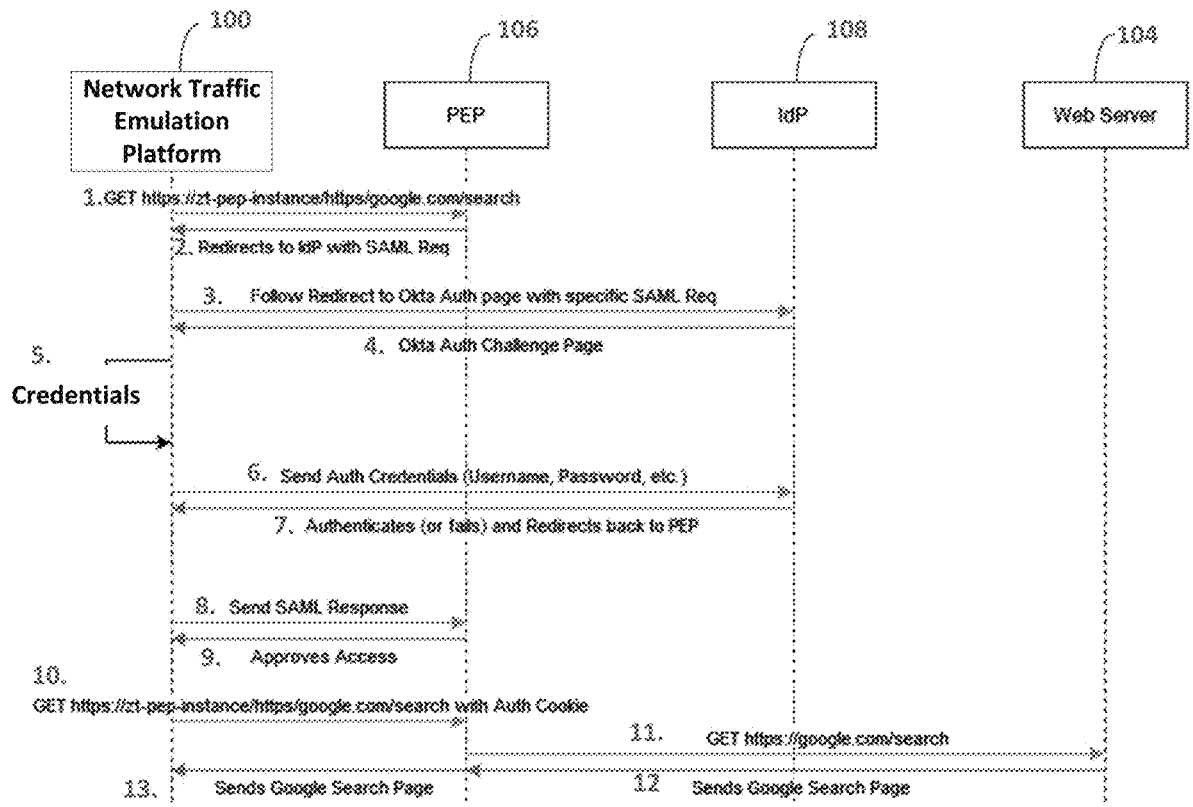

FIG. 5B is another example of an application flow combined with messaging associated with authentication profile. In FIG. 5B, rather than establishing a tunnel with web server 102, network traffic emulation platform 100 connects with PEP 106, which operates as a web proxy. Referring to the message flow illustrated in FIG. 5B, in step 1, network traffic emulation platform 100 sends an HTTP CONNECT request to PEP 106 to connect to google.com. In step 2, PEP 106 responds with a message that redirects network traffic emulation platform to IdP 108. In step 3, network traffic emulation platform 100 initiates the messaging associated with the authentication profile by contacting IdP 108 with an SAML request. In step 4, IdP 108 responds with an Okta authentication challenge page. In step 5, network traffic emulation platform 100 provides authentication credentials requested by the Okta challenge page. Normally, such credentials would be input by the user. In this case, the authentication credentials are provided by the authentication profile being emulated by network traffic emulation platform 100. In step 6, network traffic emulation platform 100 sends the authentication credentials to IdP 108. In step 7, IdP 108 responds indicating that the authentication has passed or failed and redirects network traffic emulation platform back to PEP 106.

In step 8, network traffic emulation platform 100 sends an SAML response to PEP 106. In step 9, PEP 106 approves access. In step 10, network traffic emulation platform 100 sends an HTTP GET request with search terms and an authentication cookie to PEP 106 functioning as a web proxy for web server 104. In step 11, PEP 106 forwards the request with the search terms to web server 104. In step 12, web server 104 provides the requested search results to network traffic emulation platform 100 via PEP 106. Thus, FIG. 5B illustrates a combination of an application flow and an authentication profile where the authentication profile is separate from the application flow and can be combined with other application flows.

Figure 6A:
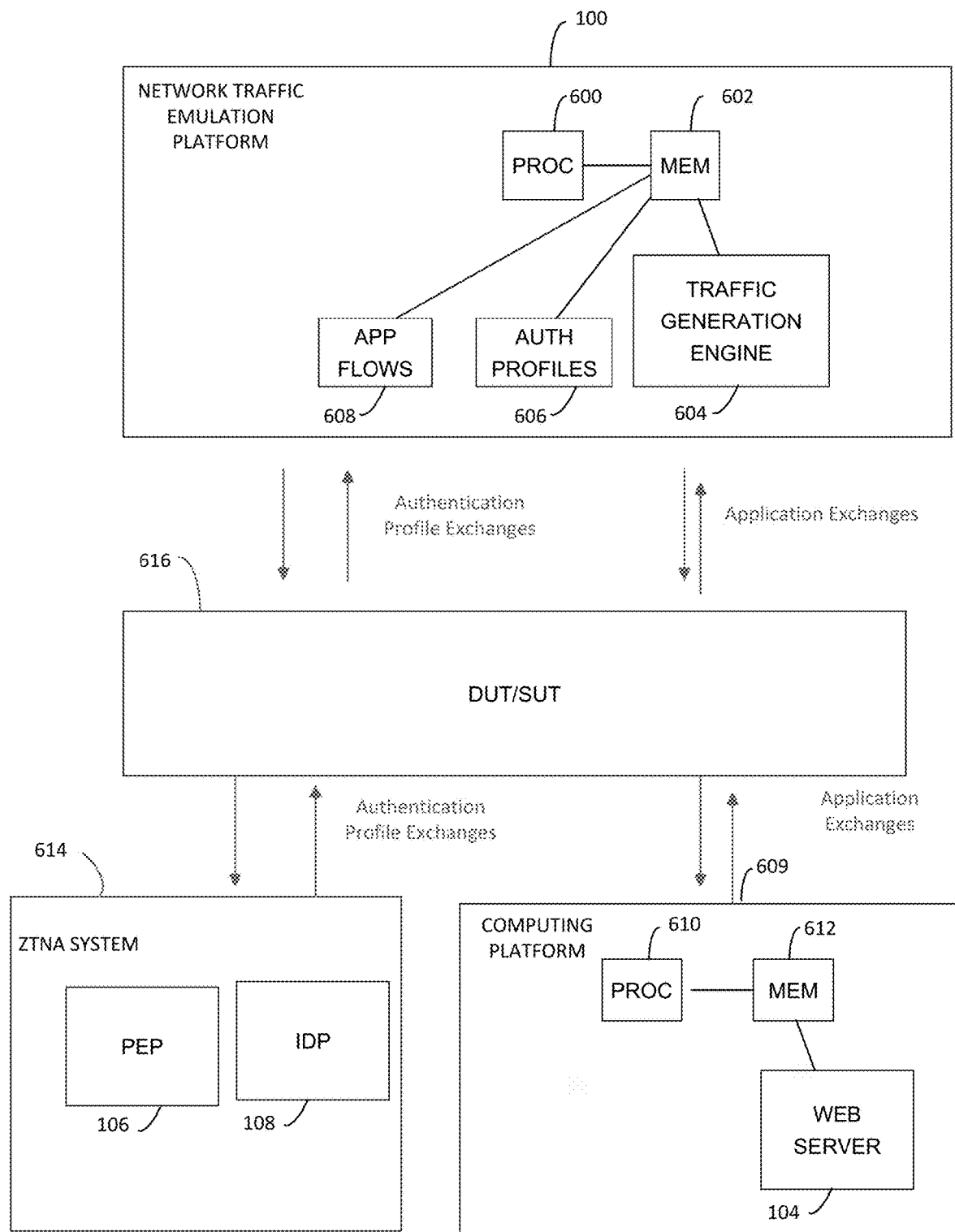
FIG. 6A is a block diagram illustrating an exemplary system for ZTNA testing using application-independent authentication profiles and application flows.

FIG. 6A is a block diagram illustrating an exemplary architecture for a network traffic emulation system with application independent authentication profiles. Referring to FIG. 6A, network traffic emulation platform 100 includes at least one profile processor 600 and a memory 602. Network traffic emulation platform 100 also includes a traffic generation engine 604 that generates emulated traffic to transmit to network applications, such as web server 104. Network traffic platform 100 includes authentication profiles 606 and application flows 608. Each authentication profile 606 causes traffic generation engine 604 to generate traffic associated with an authentication profile. Application flows 608 cause traffic engine 604 to generate packet traffic that emulates an exchange with a network application. A user interface (UI) 607 allows the user to select application flows 608 and separately select authentication profiles 606 to provide to traffic generation engine 604. User interface 607, in one example, may be a graphical user interface of the form illustrated in FIGS. 5A and 5B.

Web server 104 may execute on a computing platform 609. Computing platform 609 includes at least one processor 610 and memory 612. Web server 102 may include one or more web applications, such as email applications, social medial applications, search engine applications, etc. In another example, web server 104 may be an emulated server that executes on network traffic emulation system 100.

ZTNA system includes PEP 106 and IdP 108. PEP 106 and IdP 108 implement the functions described above for authentication users seeking to access network resources.

When a user selects one or more application flows and an authentication profile and starts a test, the application flow transmits the first packet to the intended destination. If a response from an authentication server, such as PEP 106, is received, the authentication profile is triggered, and the authentication profile causes traffic generation engine 604 to implement authentication profile exchanges with ZTNA system 614 via one or more devices or systems under test (DUT/SUT) 616. Devices or systems under test 616 may include routers, switches, firewalls, load balancers, or any other device that would encounter ZTNA-authenticated application flows. If the authentication profile exchanges are successfully completed, traffic generation engine 604 implements the application message exchanges specified by the selected application flow(s). The application flow causes traffic generation engine 604 to generate and send emulated application traffic to an application, such as web server 104, and to listen for responses from web server 104. Using different combinations of authentication profiles and application flows, network traffic emulation platform 100 can communicate with different applications that operate in networks with different ZTNA systems without requiring that the application flows be hard coded with all of the different authentication profiles.

Figure 6B:
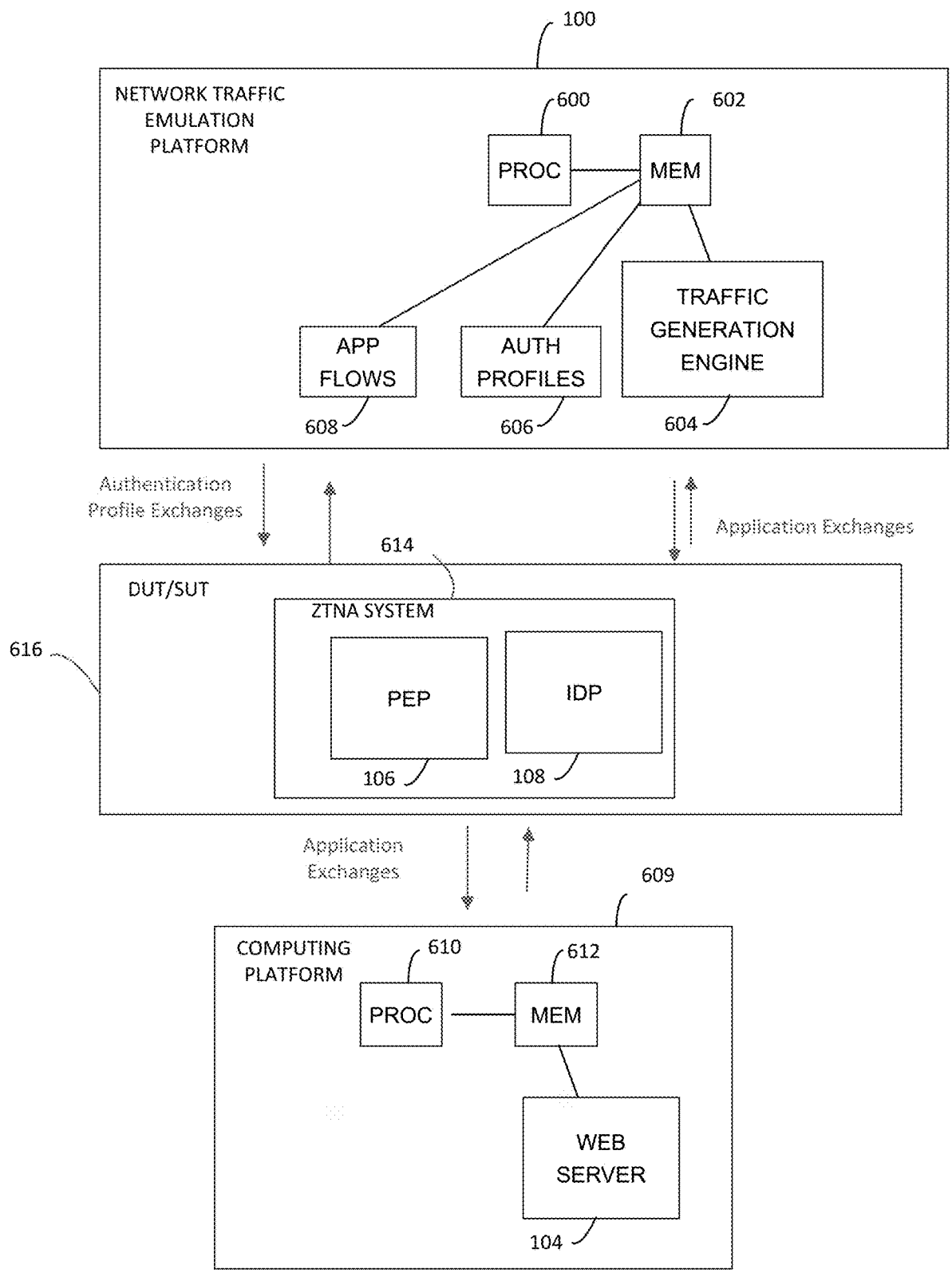
FIG. 6B is a block diagram illustrating an exemplary system for ZTNA testing where the ZTNA system is a component of the DUT/SUT.

FIG. 6B is a block diagram illustrating an exemplary system for ZTNA testing where the ZTNA system is a component of the DUT/SUT. In FIG. 6B, ZTNA system 614 is a component of DUT/SUT 616. Network traffic emulation platform 100 may perform the same actions described with respect to FIG. 6A to test the performance and/or functionality of ZTNA system 614, including PEP 106 and IDP 108.

Figure 7:
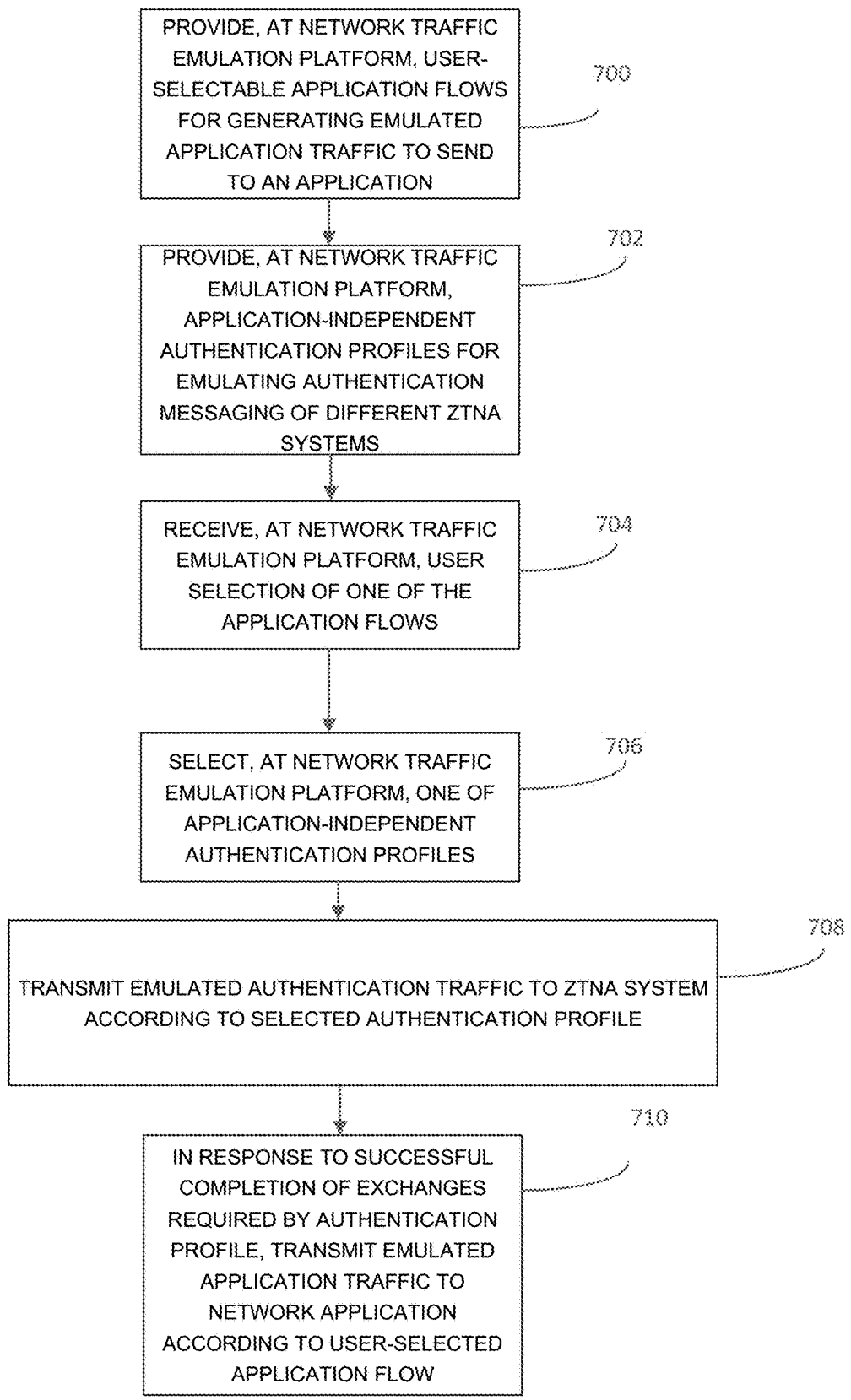
FIG. 7 a flow chart illustrating an exemplary process for ZTNA testing using application-independent authentication profiles and application flows.

FIG. 7 is a flow chart illustrating a process for ZTNA testing using application-independent authentication profiles. Referring to FIG. 7, in step 700, the process includes providing, at a network traffic emulation platform, a plurality of user-selectable application flows for generating emulated application traffic to send to an application. For example, network traffic emulation platform 100 may be configured with different application flows to send emulated application traffic to web servers that host applications, such as social media applications, email applications, search engines, etc.

In step 702, the process includes providing, at the network traffic emulation platform, a plurality of application-independent authentication profiles for emulating authentication messaging of different ZTNA systems. For example, network traffic emulation platform 100 may be configured with authentication profiles that implement different exchanges with PEPs and IdPs to implement authentication protocols required by different ZTNA systems.

In step 704, the process includes receiving, at the network traffic emulation platform, user selection of one or more of the application flows. For example, network traffic emulation platform 100 may provide a graphical user interface that allows users to select different flows of application traffic, and the user selection may be received via the graphical user interface.

In step 706, the process further includes selecting, at the network traffic emulation platform, one of the application-independent authentication profiles. For example, network traffic emulation platform 100 may provide a graphical user interface that allows the user to select different authentication profiles, and the user selection may be received via the graphical user interface. If the user selects one authentication profile, the traffic generation engine may select that profile for the generation of emulated authentication traffic. If the user selects more than one of the authentication profiles, the traffic generation engine may select from among the user-selected authentication profiles dynamically at run-time based on a response received from an application in response to an initial application message redirecting the traffic generation engine to the ZTNA system.

In step 708, the process further includes generating and transmitting emulated authentication traffic to a ZTNA system according to the selected authentication profile. For example, network traffic emulation platform 100 may initiate an application flow by transmitting the initial message of the flow to web server 104. If a response is received from PEP 106 instead of web server 104, network traffic emulation platform 100 implements the configured or selected authentication profile. The authentication profile causes network traffic emulation platform 100 to transmit messages to PEP 106 and IdP 108. In another example, network traffic emulation platform 100 may start the authentication flow by transmitting emulated authentication messages to the ZTNA system without being redirected by the web server.

In step 710, the process further includes, in response to successful completion of exchanges required by the authentication profile, generating and transmitting emulated application traffic to the network application according to the user-selected application flow. For example, network traffic emulation platform 100 may transmit the emulated application traffic to a web server via one or more devices under test if the authentication profile is successfully completed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for zero trust network access (ZTNA) testing using application-independent authentication profiles, the method comprising: providing, at a network traffic emulation platform, a user interface that enables a user to configure a mix of emulated application flows by selecting a plurality of different emulated network applications by name and specifying a weight value for each of the emulated network applications; providing, at the network traffic emulation platform, a plurality of user-selectable application-independent authentication profiles for emulating authentication messaging of different ZTNA systems, wherein providing the application-independent authentication profiles includes providing a profile for emulating a policy enforcement point (PEP) and providing a profile for emulating an identity provider (IdP); receiving, at the network traffic emulation platform, user configuration of the mix of the application flows; and receiving, at the network traffic emulation platform, an instruction from a user to execute a test of a device under test and executing the test by: selecting, at the network traffic emulation platform, one of the application-independent authentication profiles; generating and transmitting emulated authentication traffic to the ZTNA system according to the selected authentication profile; and in response to successful completion of exchanges required by the authentication profile, generating and transmitting, to a device under test, emulated application traffic according to the user-selected application flow configured mix of application flows.

2. The method of claim 1 wherein the emulated network applications include emulated applications for communicating with applications on one or more web servers.

3. The method of claim 1 wherein generating and transmitting emulated authentication traffic to the ZTNA system includes generating and transmitting emulated PEP traffic to a PEP according to the PEP profile and generating and transmitting emulated IdP traffic to an IdP according to the IdP profile.

4. The method of claim 1 wherein generating the emulated authentication traffic includes providing the authentication profile to a traffic generation engine.

5. The method of claim 4 wherein the authentication profile causes the traffic generation engine to listen for responses to the emulated authentication traffic and to proceed with generation of the emulated application traffic when the responses conform to expected exchanges of the authentication profile.

6. The method of claim 1 wherein generating the emulated application traffic includes generating the configured mix of emulated application flows using a traffic generation engine.

7. The method of claim 1 wherein providing the user-selectable application flows and the application-independent authentication profiles includes providing a user interface allowing the user to create different combinations of the application flows and the authentication profiles by separately selecting the application flows and the authentication profiles.

8. The method of claim 7 wherein the user interface allows the user to select more than one of authentication profiles and wherein selecting one of the application-independent authentication profiles includes transmitting an initial application message to the network application according to the user-selected application flow, receiving a response, and selecting the application-independent authentication profile dynamically at run time based on the response and from the application-independent authentication profiles selected by the user.

9. A system for zero trust network access (ZTNA) testing using application-independent authentication profiles, the system comprising: a network traffic emulation platform including at least one processor and a memory; a plurality of user-selectable application-independent authentication profiles stored in the memory and for emulating authentication messaging of different ZTNA systems, wherein at least one of the user-selectable application-independent authentication profiles includes a policy enforcement point (PEP) profile and at least another of the user-selectable application-independent authentication profiles includes an identity provider (IdP) profile; a user interface for enabling a user to configure a mix of emulated application flows by selecting a plurality of different emulated network applications by name and specifying a weight value for each of the emulated network applications and for receiving an instruction from a user to execute a test of a device under test; and a traffic generation engine for executing the test by: selecting one of the application-independent authentication profiles; generating and transmitting emulated authentication traffic to a ZTNA system according to the selected authentication profile, and, in response to successful completion of exchanges required by the authentication profile; and generating and transmitting, to the device under test, emulated application traffic according to the configured mix of application flows.

10. The system of claim 9 wherein the emulated network applications include applications for communicating with applications on one or more web servers.

11. The system of claim 9 wherein the traffic generation engine is configured to generate and transmit emulated PEP traffic to a PEP according to the PEP profile and generate and transmit emulated IdP traffic to an IdP according to the IdP profile.

12. The system of claim 9 wherein the network traffic generation platform is configured to generate the emulated authentication by providing the authentication profile to the traffic generation engine.

13. The system of claim 12 wherein the authentication profile causes the traffic generation engine to listen for responses to the emulated authentication traffic and to proceed with generation of the emulated application traffic when the responses conform to expected exchanges of the authentication profile.

14. The system of claim 9 wherein the user interface allows the user to select more than one of authentication profiles and wherein, in selecting one of the application-independent authentication profiles, the traffic generation engine is configured to transmit an initial application message to the network application according to the user-selected application flow, receive a response, and select the application-independent authentication profile dynamically at run time based on the response and from the application-independent authentication profiles selected by the user.

15. The system of claim 9 wherein the user interface is configured to allow the user to create different combinations of application flows and authentication profiles by separately selecting the application flows and the authentication profiles.

16. A non-transitory computer readable medium having stored thereon executable instructions that when executed by a processor of a computer control the computer to perform steps comprising: providing, at a network traffic emulation platform, a user interface that enables a user to configure a mix of emulated application flows by selecting a plurality of different emulated network applications by name and specifying a weight value for each of the emulated network applications;

providing, at the network traffic emulation platform, a plurality of application-independent authentication profiles for emulating authentication messaging of different zero trust network access (ZTNA) systems, wherein providing the application-independent authentication profiles includes providing a profile for emulating a policy enforcement point (PEP) and providing a profile for emulating an identity provider (IdP); receiving, at the network traffic emulation platform, user configuration of the mix of the application flows; and receiving, at the network traffic emulation platform, an instruction from a user to execute a test of a device under test and executing the test by: selecting, at the network traffic emulation platform, one of the application-independent authentication profiles; generating and transmitting emulated authentication traffic to the ZTNA system according to the selected authentication profile; and in response to successful completion of exchanges required by the authentication profile, generating and transmitting, to a device under test, emulated application traffic according to the configured mix of application flows.

* * * * *